(12) United States Patent
Wallner et al.

(10) Patent No.: US 10,460,501 B2
(45) Date of Patent: Oct. 29, 2019

(54) SYSTEM AND METHOD FOR PROCESSING DIGITAL VIDEO

(71) Applicant: DEEP Inc. Canada, Toronto (CA)

(72) Inventors: Thomas Wallner, Toronto (CA); Scott Herman, Toronto (CA); Franz Hildgen, Toronto (CA)

(73) Assignee: Liquid Cinema Inc., Canada, Toronto (CA)

( * ) Notice: Subject to any disclaimer, the term of this patent is extended or adjusted under 35 U.S.C. 154(b) by 36 days.

(21) Appl. No.: 15/201,564

(22) Filed: Jul. 4, 2016

(65) Prior Publication Data
US 2018/0005447 A1    Jan. 4, 2018

(51) Int. Cl.
*G06T 15/04* (2011.01)
*G06T 15/20* (2011.01)
(Continued)

(52) U.S. Cl.
CPC .............. *G06T 15/04* (2013.01); *G06F 16/40* (2019.01); *G06Q 30/00* (2013.01); *G06T 15/205* (2013.01)

(58) Field of Classification Search
None
See application file for complete search history.

(56) References Cited

U.S. PATENT DOCUMENTS 6,859,799 B1 * 2/2005 Yuen ................. G06F 17/30265
8,762,890 B2   6/2014 Falchuk et al.
(Continued)

OTHER PUBLICATIONS

Blender Reference Manual; http://blender-manual-i18n.readthedocs.io/ja/latest/render/blender_render/textures/mapping/uv/unwrapping.html; May 2011.*

(Continued)

*Primary Examiner* — Frank S Chen
(74) *Attorney, Agent, or Firm* — Gilbert's LLP; Matthew D. Powell

(57) ABSTRACT

A computer-implemented method of processing digital video is provided. The method includes determining at least one frame region the contents of which would be rendered substantially invisible, were frames of the digital video to be subjected to a predetermined texture-mapping onto a predetermined geometry; and inserting non-image data into at least one selected frame by modifying contents within at least one determined frame region of the selected frame. Another computer-implemented method of processing digital video is provided. The method includes, for each of a plurality of frames of the digital video: processing contents in one or more predetermined regions of the frame to extract non-image data therefrom; subjecting the frame to a predetermined texture-mapping onto a predetermined geometry, wherein after the texture-mapping the contents of the one or more predetermined regions are rendered substantially invisible; and causing the texture-mapped frame to be displayed. Another computer-implemented method of processing digital video is provided. The method includes for each of a plurality of frames of the digital video: extracting a frame identifier uniquely identifying a respective frame by processing contents in one or more predetermined regions of the frame; and for each of a different plurality of frames of the digital video: estimating the frame identifier based on playback time of the digital video. Another computer-implemented method of processing digital video is provided. The method includes causing frames of the digital video to be displayed; for a period beginning prior to an estimated time of display of an event-triggering frame and ending after the estimated time, causing a frame that is to be displayed prior to the beginning of the period to remain displayed; and after the period, executing at least one event associated with the (Continued)

event-triggering frame and resuming display of subsequent frames of the digital video. Systems and computer-readable media are also provided.

43 Claims, 10 Drawing Sheets

(51) Int. Cl.
*G06Q 30/00* (2012.01)
*G06F 16/40* (2019.01)

(56) References Cited

U.S. PATENT DOCUMENTS

| | | | |
|---|---|---|---|
| 2007/0294173 A1* | 12/2007 | Levy | G06F 17/30017 705/51 |
| 2011/0310414 A1* | 12/2011 | Morimoto | G03G 15/5025 358/1.9 |
| 2012/0170803 A1 | 7/2012 | Millar et al. | |
| 2012/0256911 A1* | 10/2012 | Nakamura | G06T 15/04 345/419 |
| 2015/0281507 A1 | 10/2015 | Konen et al. | |
| 2016/0104055 A1* | 4/2016 | Lin | G06T 3/0012 382/298 |
| 2017/0052680 A1* | 2/2017 | Chegini | G06F 3/04845 |
| 2017/0124398 A1* | 5/2017 | Birkbeck | G06K 9/00718 |
| 2017/0339392 A1* | 11/2017 | Forutanpour | H04N 5/23238 |
| 2017/0353706 A1 | 12/2017 | Stelmack et al. | |

OTHER PUBLICATIONS

"Texture and other Mappings Angel Chapter 7 Computer Graphics 15-462", Feb. 1, 2002, http://www.cs.cmu.edu/~djames/15-462/Fall03/notes/09-texture.pdf, all pages.*

"Creating Textures for Celestia", https://www.classe.cornell.edu/~seb/celestia/textures.html, Jun. 19, 2003, all pages.*

* cited by examiner

FIG. 7a

```
/**
 * Create Sphere Geometry and Buffers
 * @params None
 * @return Number of vertex indices
 */
int VideoRenderer360::CreateSphere( const float _radius, const int _subdivisions, const int _numRings )
{
glm::vec3 center( 0.0f, 0.0f, 0.0f );

auto numSegments = _subdivisions;
// Number of vertices
auto numVerts = numSegments * _numRings;

std::vector<Vertex> buffer;
#ifdef _WIN32
std::vector<GLuint> indices;
#else
std::vector<uint16_t> indices;
#endif
std::vector<glm::vec3> position;
std::vector<glm::vec2> texpos;

// Number of indices, this tells how to draw the triangles
auto numInds = ( numSegments - 1 ) * ( _numRings - 1 ) * 6;

// Resize buffers
buffer.resize( numVerts );
indices.resize( numInds );
position.resize( numVerts );
texpos.resize( numVerts );

double ringIncr = 1.0 / static_cast<double>( _numRings - 1 );
double segIncr = 1.0 / static_cast<double>( numSegments - 1 );

size_t currIdx = 0;
size_t bufIdx = 0;

// First Generate Points
// Rings loop
```

FIG. 7b

```
for ( auto r = 0; r < _numRings; ++r )
{
// Segments loop
for ( auto s = 0; s < numSegments; ++s )
{
// Compute position
float y = std::sin( -lcMath::PI2 + lcMath::PI * r * ringIncr );
float x = std::cos( 2 * lcMath::PI * s * segIncr ) * std::sin( lcMath::PI * r * ringIncr );
float z = std::sin( 2 * lcMath::PI * s * segIncr ) * std::sin( lcMath::PI * r * ringIncr );
// LOG_ERROR( "%s() Ring %d, Segment %d, x : %.4f, y : %.4f, z : %.4f", __FUNCTION__,
r, s, x, y, z );
// normals[ currIdx ] = glm::vec3( x, y, z );
auto pos = glm::vec3( x * _radius + center.x, y * _radius + center.y, z * _radius + center.z
);

// Texture position (assume equirectangular projection)
auto tex = glm::vec2( s * segIncr, r * ringIncr );
position[ bufIdx ] = pos;
texpos[ bufIdx ] = tex;
buffer[ bufIdx++ ] = Vertex( pos, tex );
++currIdx;
}
} currIdx = 0;

// Set the indices for the triangles
for ( auto r = 0; r < _numRings - 1; ++r )
{
for ( auto s = 0; s < numSegments - 1; ++s )
{
#if _WIN32
// Generate 2 triangles, need 3 points per triangle
indices[ currIdx++ ] = (GLuint)( r * numSegments + ( s + 1 ) );
indices[ currIdx++ ] = (GLuint)( r * numSegments + s );
indices[ currIdx++ ] = (GLuint)( ( r + 1 ) * numSegments + ( s + 1 ) );

{
indices[ currIdx++ ] = (GLuint)( ( r + 1 ) * numSegments + s );
indices[ currIdx++ ] = (GLuint)( ( r + 1 ) * numSegments + ( s + 1 ) );
indices[ currIdx++ ] = (GLuint)( r * numSegments + s );
```

FIG. 7c

```
}
#else
indices[ currIdx++ ] = (uint16_t)( r * numSegments + ( s + 1 ) );
indices[ currIdx++ ] = (uint16_t)( r * numSegments + s );
indices[ currIdx++ ] = (uint16_t)( ( r + 1 ) * numSegments + ( s + 1 ) );

{
indices[ currIdx++ ] = (uint16_t)( ( r + 1 ) * numSegments + s );
indices[ currIdx++ ] = (uint16_t)( ( r + 1 ) * numSegments + ( s + 1 ) );
indices[ currIdx++ ] = (uint16_t)( r * numSegments + s );
} endif
}
}

// OpenGL code to upload geometry, texture coordinates and triangles indices
#ifdef _WIN32
m_SphereMesh.CreateVAO();
m_SphereMesh.BindVAO();
m_SphereMesh.AddMesh( "aPosition", 0, position, "aTexCoord", 1, texpos );
m_SphereMesh.AddIndices( "elements", indices );
m_SphereMesh.UnBindVAO();

#else
m_SphereMesh.AddInterleaved( "sphere", buffer, indices );
#endif

//indices.resize( currIdx );
check_gl_error( __FUNCTION__ );
// return number of indices
return currIdx;
}
```

SYSTEM AND METHOD FOR PROCESSING DIGITAL VIDEO

FIELD OF THE INVENTION

The following relates generally to electronic data processing, and more particularly to systems and methods for processing digital video.

BACKGROUND OF THE INVENTION

A wide variety of computing devices such as gaming consoles, virtual-reality equipment, augmented-reality equipment, mixed-reality equipment, smart televisions, set top boxes, desktop computers, laptops, smartphones, and specialty devices such as iPods, are available to consumers. The computing capabilities of many of these devices can be harnessed by creative content producers to provide very rich, immersive and interactive media content.

For example, filmmakers, digital content creators and technology developers have been developing 360-video capture systems, corresponding authoring tools and compatible media players to create and present interactive and immersive media experiences for a variety of platforms including virtual reality. Such video capture systems include multiple individual but coordinated video cameras positioned in an array in which each camera has a unique position and field of view to collectively capture video that spans 360×180 degrees. Frames of the captured digital video from the video cameras are synchronized and stitched together using image processing algorithms to produce video frames each of which contains 360×180 content. Each of these video frames is typically stored in an equirectangular format, to facilitate straightforward projection onto a geometry such as a spherical mesh for playback.

A user can be provided with the impression that he or she is positioned at the centre of the sphere looking outward towards the captured scenes, in a manner analogous to the position of the cameras during video capture. In addition, the user may be provided with the ability to adjust his or her perspective and field of view, such as by using a mouse on a desktop-style system, a touch-display on a typical smartphone, or actual physical movement using virtual reality headgear (Head Mounted Display, or HMD), in order to face any part of the 360×180 video that is being played back. In this way, the user can "look around" and in any direction will see the respective portions of the film unfolding as it is played back just as one can look around in reality.

Processes for producing digital video from raw content such as that captured by a 360-video capture system are well understood. Speciality software tools are used to stitch together the content from the different camera angles to produce the raw video. Then, the raw video can be edited and spliced with other video, graphic overlays and the like, on a computer workstation using software tools. When the author/editor is satisfied with the content, the digital video is considered "locked," and post-production tools can be used to convert the locked digital video into a form suitable for transmission, playback and storage using various media players, devices and the like. For example, it is typical to encode raw video into a format such as MP4 using H.264 or H.265 to compress the video so that the overall file in which it is contained is smaller and wieldy for storage and transmission. Encoders are sets of hardware and software that receive the original raw digital video content as input and that output an encoded digital video file. Transcoders are sets of hardware and software that receive an encoded video file and re-encode the file into a different encoded format. Decoders are sets of hardware and software that receive an encoded video file, and extract each frame as pixel data so that the pixel data can be inserted into a memory buffer which can be later stored in a frame buffer for subsequent display by a display device. Together, coders/transcoders and decoders are typically referred to as codecs.

There are challenges to producing content that can be enjoyed on a wide variety of computing devices, systems and platforms. For example, numerous codecs are available. Because of the nature of the algorithms used in codecs and the way decoded frames are buffered prior to display, codecs do not generally enable a playback device such as a media player to know exactly which frame has been decoded. Instead, some codecs produce and expose an elapsed time from which an approximation as to an actual frame number can be derived. As such, due to this nature of compression algorithms and buffering, the playback time indicated by a media player's decoder for a particular frame may not, for example, coincide with the actual playback time that might be indicated by another media player's decoder for the same frame. For example, there may be a disparity on the order of 5 to 10 frames on a 30 frame per second (fps) playback.

When authoring digital videos, an author/editor may wish to add certain events which are to be triggered by a media player during playback. Parameters specifying such events and their exact timing may be stored as metadata in a file associated with the digital video, and be identified according to frame number or playback time. For example, the author/editor may wish to trigger the media player to live-render and display a particular graphical overlay caption or subtitle, to play a sound and/or to launch an interactive event just as a particular frame is displayed. As another example, the author/editor may wish to trigger the media player to play a separate and independent video overlaid atop a 360 video, just as a particular frame of the 360 video is displayed. Such graphical elements, auditory cues, interactive events and videos independent from the 360 video can be very useful to content authors. This is the case because such additional events do not have to be "baked into" the main digital video itself. They can be rendered independently and/or in parallel with the main video, greatly expanding the possible real time interactive nature of the experience during the viewing of such video. It also allows such additional events to be fine-tuned in subsequent productions without requiring re-working of the digital video itself.

Frame-accurate event-triggering is crucial for certain kinds of events. As an example, for digital video that switches between 360-video and traditional non-spherical video segments, a media player must know precisely at which frame to switch from displaying video frames as flat projections to displaying the video frames as spherical projections, and vice versa. When a frame and its projection are not matched, the experience for a user will become jarring and difficult to perceive as realistic. While some media players can extract and provide frame sequence data that may accompany digital video of certain formats, how this may be done, if at all, is not universal across all of the various media players and video formats. As such, content producers are left with a deficiency of control over how the content they have created will ultimately be experienced by a user. Even an approximation of the frame based on playback time as measured by the media player can produce poor results. For a projection switch done even a few frames earlier or later than the frame at which the switch should precisely have happened the small series of mismatched frames can be jarring enough to disturb the user.

It has been proposed to embed visual timecodes as non-image data into the frames themselves to uniquely identify the frames. With this approach, upon decoding and instead of relying on playback time, the media player can process the frames to read the visual timecodes and thereby be aware of exactly which frame has been decoded. However, since such visual timecodes are actually integrated as part of the digital video itself, absent some additional processing the media player will naturally display them along with the rest of the digital video content such that the user will see them. For traditional flat film, where visual timecodes may be positioned in the uppermost or lowermost region of the frame, such additional processing may include the frame being cropped and/or stretched to remove the visual time code, prior to being inserted into a frame buffer for display. Such cropping or minor stretching of a frame of flat film does not distort the frame and the user is typically unaware that anything has been done.

However, it is problematic to attempt simply cropping or stretching an equirectangular frame to remove a visual timecode in the same way. Such a modification to an equirectangular frame would manifest itself, upon mapping to a sphere, as significant and noticeable distortion. Because of this, it is difficult to hide a visual timecode in such a frame. The visual timecode may be positioned in the equirectangular frames such that it will be mapped to a position near to the zenith (top) or nadir (bottom) of the sphere. This will cause it to be squeezed and distorted thereby reducing the likelihood that it will be noticed. However, it will still remain as an undesirable and disturbing visual artifact.

When viewing 360 video on a desktop computer, a mobile device or the like, it may be acceptable to programmatically limit the degree of freedom available to the user, so the user is simply unable to adjust his or her field of view to encompass the area where the visual timecode is positioned. However, particularly in the virtual reality context, where the user using a HMD can adjust his or her field of view by physically moving his or her head or body, it is not possible to limit the user's movement physically. Furthermore, in the virtual reality context, masking out the visual timecode would create another visual artifact and would prevent showing the 360-degree sphere in its entirety, greatly detracting from the immersive quality of the medium.

It has been proposed to automatically replace the pixels of a visual timecode, once it has been extracted from the frame, with pixels that better match the surrounding, non-timecode content. However, algorithms for detecting surrounding pixel colours and their intensities for overwriting the timecode pixels generally can produce noticeable visual artifacts. Such algorithms also tend to be processor-intensive, consuming valuable computing resources thereby having a detrimental effect on the playback frame rate. This can be particularly problematic for applications in which a higher frame rate is important for user experience, such as in virtual reality.

SUMMARY OF THE INVENTION

In accordance with an aspect, there is provided a computer-implemented method of processing digital video, the method comprising: determining at least one frame region the contents of which would be rendered substantially invisible, were frames of the digital video to be subjected to a predetermined texture-mapping onto a predetermined geometry; and inserting non-image data into at least one selected frame by modifying contents within at least one determined frame region of the selected frame.

In an embodiment, the predetermined geometry is a spherical mesh and the non-image data is a frame identifier uniquely identifying each of the at least one selected frame.

When mapping a frame onto a spherical mesh, the data in the frame is typically represented in equirectangular format to accommodate being "wrapped" around the sphere. As would be recognized upon observing an equirectangular projection of a World map, much of the image information towards the top and bottom areas of the map is quite stretched whereas the image information towards the middle area is not stretched to the same extent. The equirectangular projection therefore contains redundant image data in these upper and lower areas that is "folded-over", in a sense, when the equirectangular projection is mapped to the sphere. According to an embodiment of the invention, non-image data of selected size is inserted into at least one selected frame in at least one region within this upper area and/or this lower area. The non-image data is available to be machine-read but, because of its selected size and selected position in the equirectangular projection, will not be visible to a user once the frame is mapped for display onto the spherical mesh.

In accordance with another aspect, there is provided a computer-implemented method of processing digital video, the method comprising: for each of a plurality of frames of the digital video: processing contents in one or more predetermined regions of the frame to extract non-image data therefrom; subjecting the frame to a predetermined texture-mapping onto a predetermined geometry, wherein after the texture-mapping the contents of the one or more predetermined regions are rendered substantially invisible; and causing the texture-mapped frame to be displayed.

In accordance with another aspect, there is provided a system for processing digital video comprising: processing structure determining at least one frame region the contents of which would be rendered substantially invisible, were frames of the digital video to be subjected to a predetermined texture-mapping onto a predetermined geometry, the processing structure inserting non-image data into at least one selected frame by modifying contents within at least one determined frame region of the selected frame.

In accordance with another aspect, there is provided a system for processing digital video comprising: processing structure that, for each of a plurality of frames of the digital video: processes contents in one or more predetermined regions of the frame to extract non-image data therefrom; subjects the frame to a predetermined texture-mapping onto a predetermined geometry, wherein after the texture-mapping the contents of the one or more predetermined regions are rendered substantially invisible; and causes the texture-mapped frame to be displayed.

In accordance with another aspect, there is provided a processor readable medium embodying a computer program for processing digital video, the computer program comprising program code determining at least one frame region the contents of which would be rendered substantially invisible, were frames of the digital video to be subjected to a predetermined texture-mapping onto a predetermined geometry; and program code inserting non-image data into at least one selected frame by modifying contents within at least one determined frame region of the selected frame.

In accordance with another aspect, there is provided a processor readable medium embodying a computer program for processing digital video, the computer program comprising: program code that, for each of a plurality of frames of the digital video: processes contents in one or more predetermined regions of the frame to extract non-image data therefrom; subjects the frame to a predetermined texture-mapping onto a predetermined geometry, wherein after the texture-mapping the contents of the one or more predetermined regions are rendered substantially invisible; and causes the texture-mapped frame to be displayed.

In accordance with another aspect, there is provided a computer-implemented method of processing digital video, the method comprising: causing frames of the digital video to be displayed; for a period beginning prior to an estimated time of display of an event-triggering frame and ending after the estimated time, causing a frame that is to be displayed prior to the beginning of the period to remain displayed; and after the period, executing at least one event associated with the event-triggering frame and resuming display of subsequent frames of the digital video.

In an embodiment, at least one event associated with the event-triggering frame is executed during the period.

In accordance with another aspect, there is provided a computer-implemented method of processing digital video, the method comprising: for each of a plurality of frames of the digital video: extracting a frame identifier uniquely identifying a respective frame by processing contents in one or more predetermined regions of the frame; and for each of a different plurality of frames of the digital video: estimating the frame identifier based on playback time of the digital video.

In an embodiment, the estimating is conducted after the extracting in response to detecting a drop in quality of the frames of the digital video below a threshold level. In an embodiment, the extracting is conducted after the estimating in response to detecting a rise in quality of the frames of the digital video to or above a threshold level.

In accordance with another aspect, there is provided a system for processing digital video comprising: processing structure causing frames of the digital video to be displayed, the processing structure, for a period beginning prior to an estimated time of display of an event-triggering frame and ending after the estimated time, causing a frame to be displayed prior to the beginning of the period to remain displayed, the processing structure, after the period, executing at least one event associated with the event-triggering frame and resuming display of subsequent frames of the digital video.

In accordance with another aspect, there is provided a processor readable medium embodying a computer program for processing digital video, the computer program comprising: program code causing frames of the digital video to be displayed; program code, for a period beginning prior to an estimated time of display of an event-triggering frame and ending after the estimated time, causing a frame that is to be displayed prior to the beginning of the period to remain displayed; and program code, after the period, executing at least one event associated with the event-triggering frame and resuming display of subsequent frames of the digital video.

In accordance with another aspect, there is provided a system for processing digital video comprising processing structure that, for each of a plurality of frames of the digital video: extracts a frame identifier uniquely identifying a respective frame by processing contents in one or more predetermined regions of the frame; and for each of a different plurality of frames of the digital video: estimates the frame identifier based on playback time of the digital video.

In accordance with another aspect, there is provided a processor readable medium embodying a computer program for processing digital video, the computer program comprising program code that, for each of a plurality of frames of the digital video: extracts a frame identifier uniquely identifying a respective frame by processing contents in one or more predetermined regions of the frame; and for each of a different plurality of frames of the digital video: estimates the frame identifier based on playback time of the digital video.

Systems, methods and processor-readable media according to this description provide non-image data within the digital video frame itself, amongst image data. For example, the data may include a frame identifier uniquely identifying the frame and/or may include an instruction for a media player such as a block of pixels of a particular colour that the media player takes as an instruction to execute an event when the media player is displaying the frame, for example a projection switch from 360-film to flat film. Alternatively or in some combination, the data may include a more complex code such as a two-dimensional barcode carrying instructions to execute an event along with event parameters, and/or digital rights management information and/or other non-image data. Such non-image data may, for example, include instructions for the media player to begin billing a customer for a pay-per-view program being streamed after a free preview. Such non-image data may include instructions for the media player to begin showing advertisements or other overlays atop the digital video. For example, such instructions may be intended to cause the media player to begin overlaying selected types of advertisement banners during particular scenes, such as advertisements for food products during a restaurant scene, advertisements for automobiles during a car chase scene, and advertisements for warm clothing during a wilderness scene. In this way, advertisements may be selected by the media player based on products and services physically proximate to the location of the viewing device (and thus the user), that are of the type triggered by the code in the instructions in the frame and that therefore do not have to be pre-selected by a filmmaker in advance.

Systems and methods disclosed herein enable a digital video creator to pass non-image data through to downstream devices, systems and software such as media players. Because the non-image data is incorporated within the frame, it serves as a platform independent, codec-agnostic and frame-accurate data transport mechanism. Furthermore, positioning and dimensioning the non-image data being incorporated according to an expected mapping as described herein keeps the non-image data substantially invisible (i.e., practically unnoticeable or completely invisible) to the user, without the need for stretching or cropping, thereby maintaining the integrity of the image content that is intended to be seen.

Systems, methods and processor-readable media disclosed herein provide compensations for triggering of events where mismatches between frames estimated to be displayed and frames actually being displayed by a media player occur at the time an event-triggering frame is to be displayed.

Systems, methods and processor-readable media disclosed herein also provide alternative approaches to determining frame numbers in the event that frame identifiers can no longer be extracted from a frame of a digital video due to a reduction in frame quality or some other factor.

Systems, methods and processor-readable media disclosed herein are applicable to digital video content whether it is intended to be downloaded in its entirety, streamed, and/or is live-streamed or broadcast.

BRIEF DESCRIPTION OF THE DRAWINGS

Embodiments of the invention will now be described with reference to the appended drawings in which:

FIGS. 7a, 7b and 7c, hereinafter referred to as FIG. 7, is sample OpenGL code for creating sphere geometry and buffers as well as sample OpenGL code for uploading the geometry.

DETAILED DESCRIPTION

Figure 1:
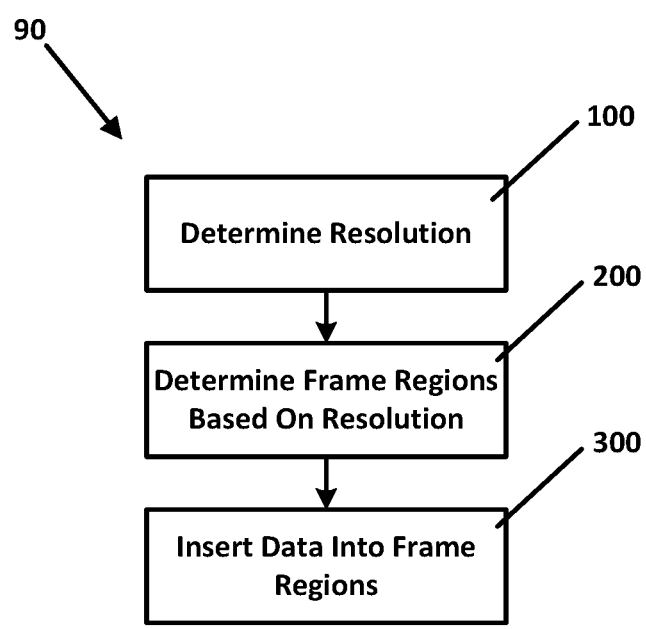
FIG. 1 is a flowchart depicting steps in a method, according to an embodiment.

FIG. 1 is a flowchart depicting steps in a process 90 for processing digital video, according to an embodiment. In this embodiment, during process 90, the resolution of the digital video is determined (step 100). The process 90 proceeds with determining at least one frame region the contents of which would be rendered substantially invisible, were frames of the digital video to be subjected to a predetermined texture-mapping onto a predetermined geometry (step 200). In this embodiment, the predetermined geometry is a spherical mesh. With this/these frame region(s) having been determined, the process 90 proceeds with inserting non-image data into at least one selected frame by modifying contents within at least one determined frame region of the selected frame (step 300). While in this embodiment resolution is determined, it will be understood that in an alternative embodiment where resolution is known a priori, the step of determining resolution of digital video would not be required.

In this embodiment, the non-image data that is inserted into the frames includes a respective frame identifier that uniquely identifies each frame in the digital video. Also, in this embodiment, each frame identifier also identifies the sequential position of each frame in the digital video. As such, the frame identifier may be considered a frame-accurate timecode across all platforms, devices and systems, as distinct from the elapsed time timecode generated by a codec of a particular media player on a particular system that is merely an approximation to the actual frame and thus is not reliably frame-accurate. Furthermore, in this embodiment, each frame in the digital video has a respective frame identifier inserted into it, so that all frames received by a decoder can, once decoded, be processed in order to extract the frame identifier data instead of relying on the decoder's timecode.

Figure 2:
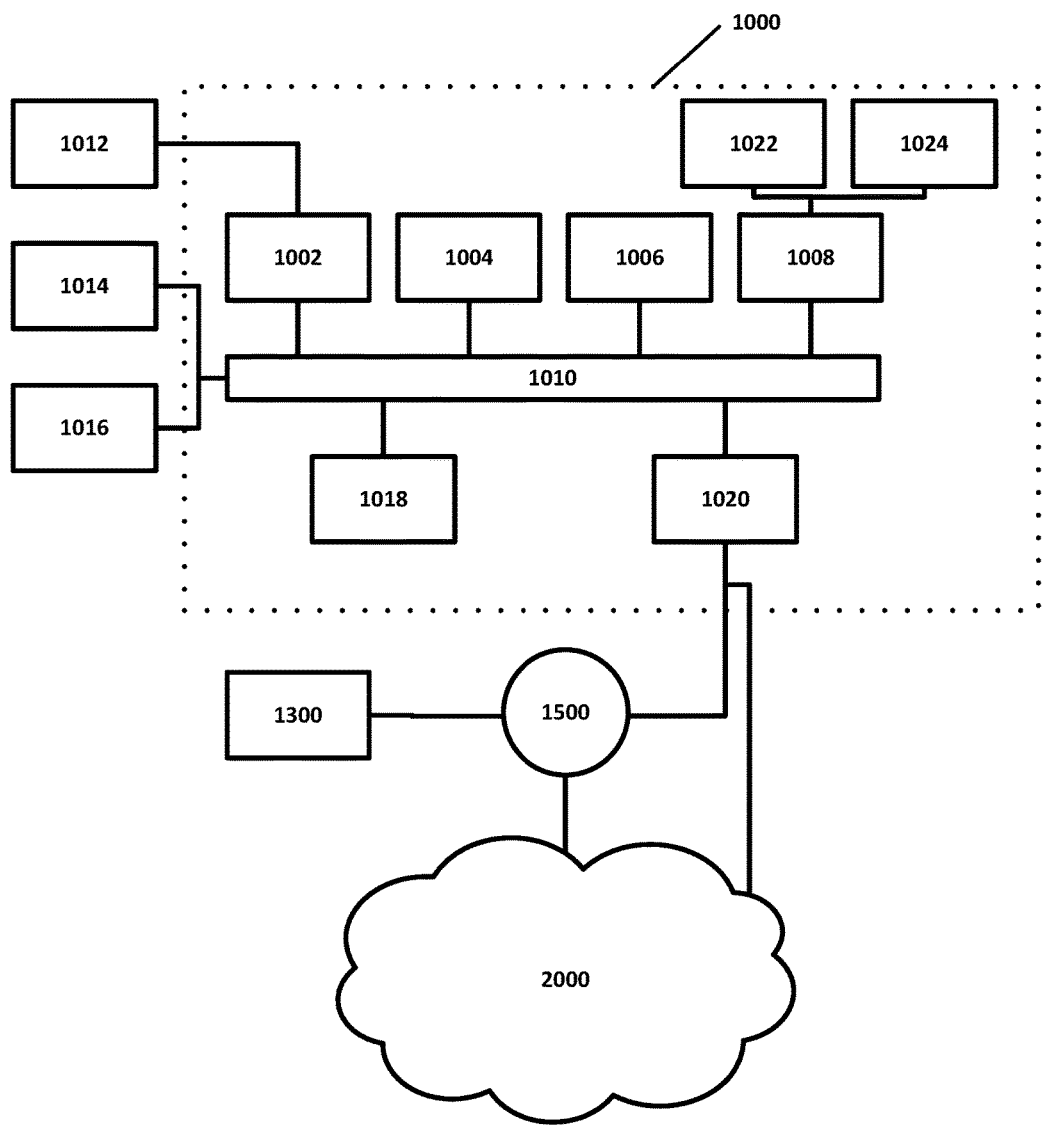
FIG. 2 is a schematic diagram of a computing system according to an embodiment.

In this embodiment, process 90 is executed on one or more systems such as special purpose computing system 1000 shown in FIG. 2. Computing system 1000 may also be specially configured with software applications and hardware components to enable a user to author, edit and play media such as digital video, as well as to encode, decode and/or transcode the digital video from and into various formats such as MP4, AVI, MOV, WEBM and using a selected compression algorithm such as H.264 or H.265 and according to various selected parameters, thereby to compress, decompress, view and/or manipulate the digital video as desired for a particular application, media player, or platform. Computing system 1000 may also be configured to enable an author or editor to form multiple copies of a particular digital video, each encoded with a respective bitrate, to facilitate streaming of the same digital video to various downstream users who may have different or time-varying capacities to stream it through adaptive bitrate streaming.

Computing system 1000 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

The computing system 1000 also includes a disk controller 1008 coupled to the bus 1010 to control one or more storage devices for storing information and instructions, such as a magnetic hard disk 1022 and/or a solid state drive (SSD) and/or a flash drive, and a removable media drive 1024 (e.g., solid state drive such as USB key or external hard drive, floppy disk drive, read-only compact disc drive, read/write compact disc drive, compact disc jukebox, tape drive, and removable magneto-optical drive). The storage devices may be added to the computing system 1000 using an appropriate device interface (e.g., Serial ATA (SATA), peripheral component interconnect (PCI), small computing system interface (SCSI), integrated device electronics (IDE), enhanced-IDE (E-IDE), direct memory access (DMA), ultra-DMA, as well as cloud-based device interfaces).

The computing system 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computing system 1000 also includes a display controller 1002 coupled to the bus 1010 to control a display 1012, such as an LED (light emitting diode) screen, organic LED (OLED) screen, liquid crystal display (LCD) screen or some other device suitable for displaying information to a computer user. In this embodiment, display controller 1002 incorporates a dedicated graphics processing unit (GPU) for processing mainly graphics-intensive or other highly-parallel operations. Such operations may include rendering by applying texturing, shading and the like to wireframe objects including polygons such as spheres and cubes thereby to relieve processor 1018 of having to undertake such intensive operations at the expense of overall performance of computing system 1000. The GPU may incorporate dedicated graphics memory for storing data generated during its operations, and includes a frame buffer RAM memory for storing processing results as bitmaps to be used to activate pixels of display 1012. The GPU may be instructed to undertake various operations by applications running on computing system 1000 using a graphics-directed application programming interface (API) such as OpenGL, Direct3D and the like.

The computing system 1000 includes input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. The computing system 1000 may employ a display device that is coupled with an input device, such as a touch screen. Other input devices may be employed, such as those that provide data to the computing system via wires or wirelessly, such as gesture detectors including infrared detectors, gyroscopes, accelerometers, radar/sonar and the like. A printer may provide printed listings of data stored and/or generated by the computing system 1000.

The computing system 1000 performs a portion or all of the processing steps discussed herein in response to the processor 1018 and/or GPU of display controller 1002 executing one or more sequences of one or more instructions contained in a memory, such as the main memory 1004. Such instructions may be read into the main memory 1004 from another processor readable medium, such as a hard disk 1022 or a removable media drive 1024. One or more processors in a multi-processing arrangement such as computing system 1000 having both a central processing unit and one or more graphics processing unit may also be employed to execute the sequences of instructions contained in main memory 1004 or in dedicated graphics memory of the GPU. In alternative embodiments, hard-wired circuitry may be used in place of or in combination with software instructions.

As stated above, the computing system 1000 includes at least one processor readable medium or memory for holding instructions programmed according to the teachings of the invention and for containing data structures, tables, records, or other data described herein. Examples of processor readable media are solid state devices (SSD), flash-based drives, compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of processor readable media, includes software for controlling the computing system 1000, for driving a device or devices to perform the functions discussed herein, and for enabling the computing system 1000 to interact with a human user (e.g., digital video author/editor). Such software may include, but is not limited to, device drivers, operating systems, development tools, and applications software. Such processor readable media further includes the computer program product for performing all or a portion (if processing is distributed) of the processing performed discussed herein.

The computer code devices of discussed herein may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

A processor readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications using various communications protocols.

Various forms of processor readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a wired or wireless connection using a modem. A modem local to the computing system 1000 may receive the data via wired Ethernet or wirelessly via WiFi and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

The computing system 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet. For example, the communication interface 1020 may be a network interface card to attach to any packet switched LAN. As another example, the communication interface 1020 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices, including without limitation to enable the flow of electronic information. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc). The signals through the various networks and the signals on the network link and through the communication interface 1020, which carry the digital data to and from the computing system 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Computing system 1000 may be provisioned with or be in communication with live broadcast/streaming equipment that receives and transmits, in near real-time, a stream of digital video content captured in near real-time from a particular live event and having already had the non-image data inserted and encoded as described herein.

Alternative configurations of computing system, such as those that are not interacted with directly by a human user through a graphical or text user interface, may be used to implement process 90. For example, for live-streaming and broadcasting applications, a hardware-based encoder may be employed that also executes process 90 to insert the non-image data as described herein, in real-time.

The electronic data store implemented in the database described herein may be one or more of a table, an array, a database, a structured data file, an XML file, or some other functional data store, such as hard disk 1022 or removable media 1024.

In this embodiment, during step 100 a value representing the resolution of the digital video is passed as a parameter to a frame identifier insertion module by digital video authoring/editing software at the request of a user.

A user working on a particular composition may trigger the execution of the frame identifier insertion module from within the composition by navigating to and selecting a menu item to activate it. This may be done at any time, such as during editing in order to preview the effect of events that are being associated with particular frames. The frame identifier insertion module may alternatively be activated during a publishing routine that may subsequently automatically encode the digital video, with inserted frame identifier, into one or more formats such as MP4, AVI, MOV, or WEBM.

The resolution may alternatively be gleaned from a frame of the digital video itself, simply by the frame identifier insertion module referring to the number of pixels being represented in memory both horizontally and vertically for the frames. A standard frame aspect ratio for an equirectangular image is 2:1 such that the number of pixels spanning the width of the frame is twice the number of pixels spanning its height. Other format aspect ratios are possible and the predetermined mapping to the spherical mesh would be different for each different aspect ratio.

The resolution is to be used by the frame identifier insertion module along with the parameters representing the predetermined spherical mesh to determine how many pixels in the digital video can be modified in order to insert an appropriate frame identifier into regions of the digital video that would become substantially invisible upon being texture-mapped to the predetermined sphere mesh.

In this embodiment, each frame identifier that is to be inserted into a frame by the frame identifier insertion module represents a number in a sequence that is represented in binary. Each digit in the binary code is represented by a respective block of uniformly-coloured pixels inserted into a respective one of the determined regions. For example, a rectangular block of black pixels may be used to represent a 0, and a rectangular block of red pixels may be used to represent a 1. Alternatives are possible. However the colours and intensities of the pixels in the blocks should be selected such that the frame identifiers they represent can withstand compression during encoding so as to be reliably discernable (i.e. machine-parsable) by a media player upon decoding. As such, one recommended approach is to, when selecting a colour using RGB channels, set each colour either at full intensity or at zero intensity. One, two or all three of the RGB channels can be used to select the colour of pixels in a block, though it will of course be understood that the colour chosen for a 0 bit cannot be the same as the colour chosen for the 1 bit.

In the event that compression is not being employed, or a particular form of compression that preserves even slight colour differences is being employed, a base other than binary may be successfully employed such that more than two (2) colours could represent bits. For example, to reduce screen real-estate taken up by a frame identifier, four (4) colours could be selected rather than two (2), such that each bit could take on one of four (4) values instead of one of two (2) values.

The position and size of the blocks of uniformly-coloured pixels representing bits of the binary code is also important. As for size, the block of uniformly-coloured pixels must be sized such that it substantially eliminates the block's colour from being unduly impacted (i.e. rendered unusable as a bit in a frame identifier) during compression while being encoded. As would be understood, a bit 2×2 pixels in size in a 4K-resolution frame would likely normally be considered unimportant by a compression algorithm, such that it would be subsumed during compression as another member of an 8×8 block of pixels in the neighborhood having a uniform colour corresponding to the majority of pixels in the block, or be subsumed within its surroundings in some other way such as through inter-frame motion compensation. As such, the size of the block of uniformly-coloured pixels representing each bit of the frame identifier should be such that the compression algorithm considers it a feature unto itself warranting careful handling during compression. For example, the block of colour should remain above 50% intensity of the chosen colour.

While large blocks are useful for withstanding compression during encoding, the size of the block of uniformly-coloured pixels cannot be too large or else the block will extend beyond the regions of the frame that would become substantially invisible were the frame to be texture-mapped to the predetermined spherical mesh. This would cause a portion of the block to be visible to a user even after the mapping during playback. For the same reason, and also so that a media player can find the frame identifier in each frame that has one by processing the same memory regions (i.e. pixels) in each frame rather than consume processing resources searching around for it, the position of the block of uniformly-coloured pixels is important.

With the resolution having been determined at step 100, in this embodiment the regions of frames that would become substantially invisible are determined by determining the size of subdivisions of the frame to be texture-mapped. For clarity, the actual texture-mapping to a predetermined spherical mesh is an operation to be executed by a suitably provisioned media player after decoding of a 360 frame, such that the mapped frame is displayed. However, for frame identifiers as described herein to become substantially invisible to the eventual user it is key to establish the placement of the frame identifiers according to how the frame will be texture-mapped downstream by the media player during playback. As such, at least one frame region the contents of which would be rendered substantially invisible, were frames of the digital video to be subjected to the predetermined texture-mapping onto the spherical mesh, is determined thereby to determine where in the frames non-image data may be inserted such that the non-image data is also rendered substantially invisible upon mapping.

The predetermined spherical mesh is defined by a sphere radius, its number of (equal) latitudinal subdivisions, and its number of (equal) longitudinal subdivisions. These parameters enable the determination of subdivisions of the frame to be texture-mapped and the vertices of the spherical mesh to which the corners of the determined subdivisions will be mapped.

Figure 3:
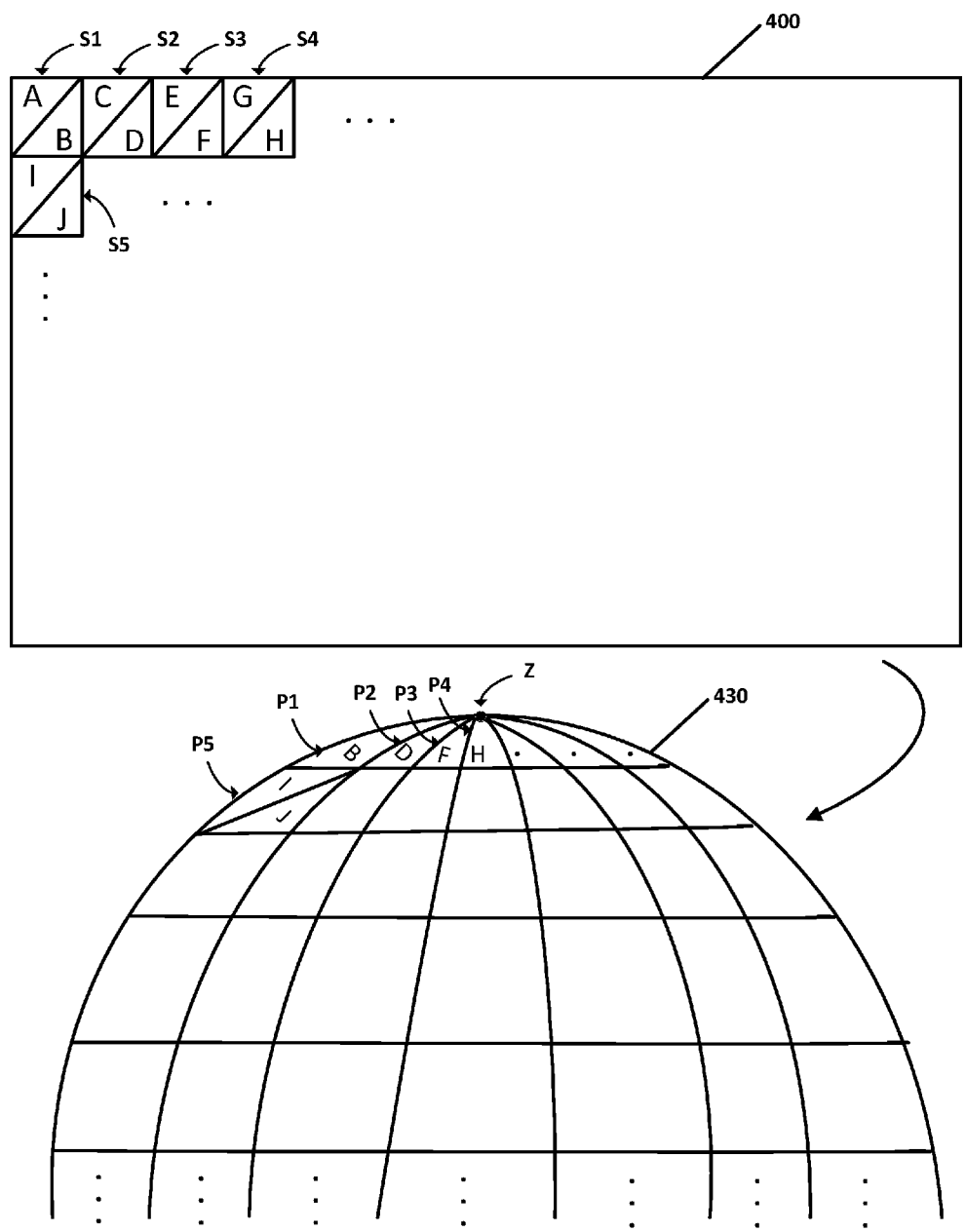
FIG. 3 is a diagram showing the mapping of subdivisions of a frame containing regions to corresponding positions on a predetermined spherical mesh, according to an embodiment.

FIG. 3 shows an example equirectangular frame 400 and the mapping of its subdivisions to respective vertices of a predetermined spherical mesh 430, the upper hemisphere of which is shown. In particular, a subdivision S1 of equirectangular frame 400 containing regions A and B is mapped to a position P1 on spherical mesh 430, a subdivision S2 containing regions C and D is mapped to a position P2 on spherical mesh 430, a subdivision S3 containing regions E and F is mapped to a position P3 on spherical mesh 430, and a subdivision S4 containing regions G and H is mapped to a position P4 on spherical mesh 430.

It can be seen in FIG. 3 that subdivisions S1, S2, S3 and S4 run along the top of frame 400 and are accordingly each texture-mapped to a respective position on spherical mesh 430 that is adjacent to its zenith Z. In contrast, a subdivision S5 containing regions I and J is mapped to a position P5 on spherical mesh that is not adjacent to zenith Z. Whereas, after texture-mapping, content from both regions I and J of subdivision S5 are visible at position P5, only content from regions B, D, F and H of subdivisions S1, S2, S3 and S4 (along with any others running along the top of frame 430 to be mapped to a position adjacent to zenith Z) is visible at positions P1, P2, P3 and P4, respectively. That is, regions A, C, E and G become substantially invisible once the frame 400 is texture-mapped to spherical mesh 430.

Regions A, C, E and G (along with similarly-positioned regions running along the top of frame 400) become substantially invisible once frame 400 is texture-mapped to spherical mesh 430. Accordingly, in this embodiment these regions are used to insert data such as the frame identifier in this embodiment, that can be parsed upon decoding but that, due to the mapping, will advantageously become invisible to the user due to the fold in the mesh.

Figure 4A:
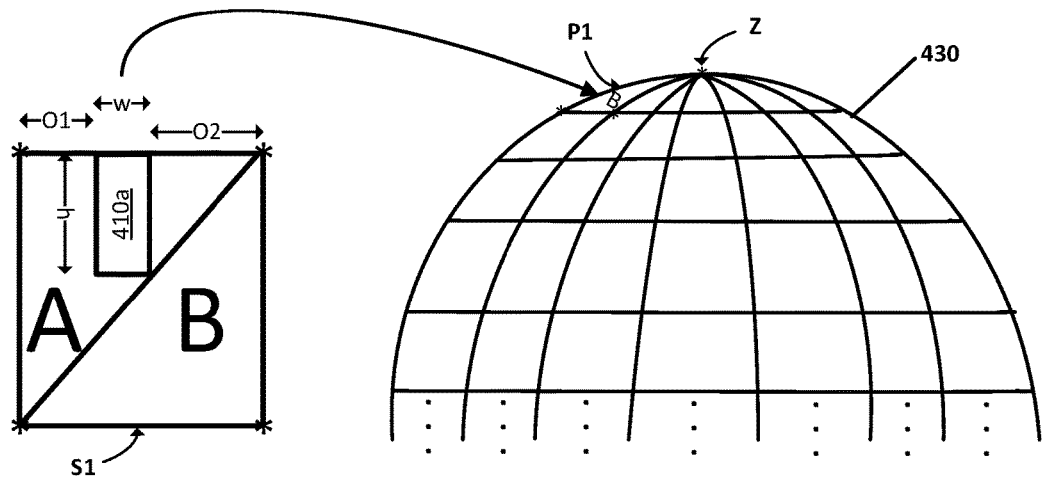
FIG. 4A is a diagram showing the mapping of a selected subdivision of the frame of FIG. 3 containing a region including one bit of a binary frame identifier, to the predetermined spherical mesh, according to an embodiment.

FIG. 4A depicts an enlarged subdivision S1 of frame 400 with a block 410*a* representing a binary bit of a frame identifier inserted into the triangular region A above its diagonal. Block 410*a* has a height of h pixels and a width of w pixels, the height and width being selected to ensure its size can withstand compression without making it so large that it extends beyond region A. Block 410*a* is positioned within region A with a left offset of O1 pixels and a right offset of O2 pixels. As subdivision S1 is mapped to the vertices of spherical mesh 430 at point P1, region A along with block 410*a* becomes invisible.

Figure 4B:
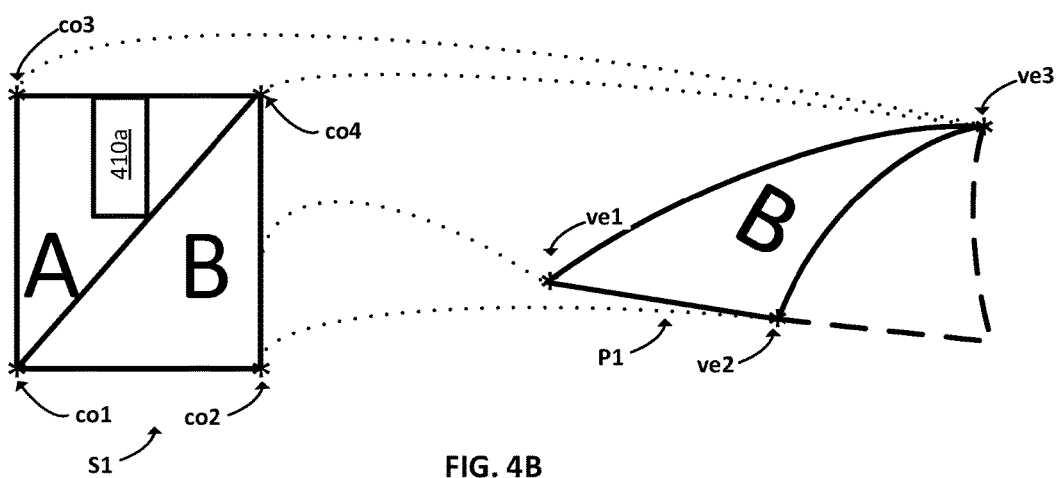
FIG. 4B is a diagram showing the mapping of corners of the selected subdivision of FIG. 4A to corresponding vertices of the predetermined spherical mesh, according to an embodiment.

FIG. 4B depicts enlarged subdivision S1 of frame 400 with block 410*a*, being mapped to the vertices of spherical mesh 430 at point P1. Whereas the lowermost corners co1 and co2 of subdivision S1 are mapped to respective different vertices ve1 and ve2, the uppermost corners co3 and co4 of subdivision S1 are both mapped to the same vertex ve3 at point P1. As such, after texture-mapping the content of region A including block 410*a* is, in essence, given no screen real-estate within which to be visible.

Figure 5:
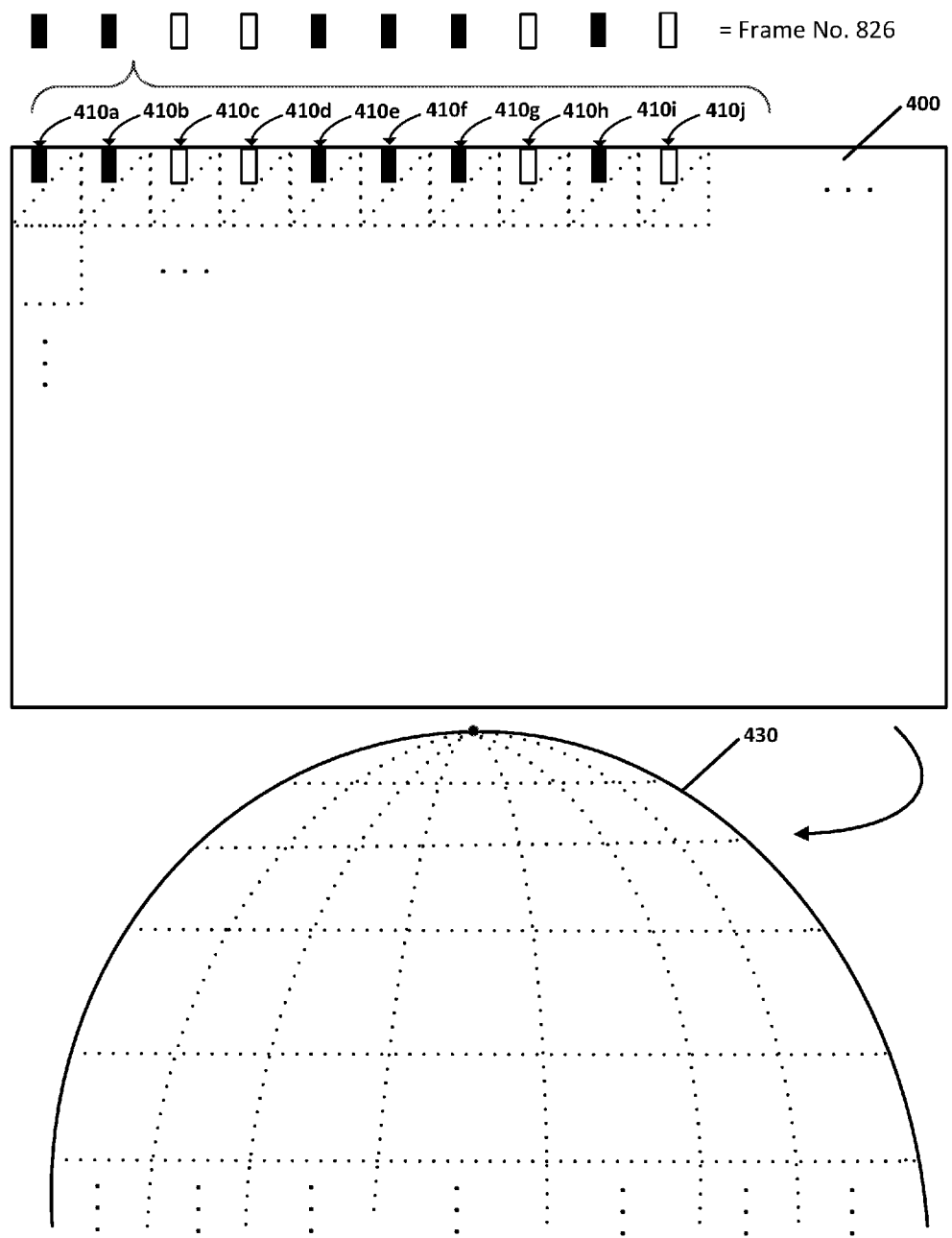
FIG. 5 is a diagram showing subdivisions of the frame of FIG. 3 having regions each containing a bit of a 10-bit binary code representing a frame identifier for the frame, according to an embodiment

FIG. 5 depicts an example frame identifier having been inserted into equirectangular frame 400 using a 10-bit binary code with blocks of pixels 410*a* to 410*j* representing binary bits. The black pixel blocks represent binary bits with a value of 1 whereas the white pixel blocks represent binary bits with a value of 0. As would be understood, a 10-bit binary code could only represent 1024 frames which, at 30 frames per second (fps) playback rate would amount to about a 34 second playing time. This would perhaps be suitable for an advertisement or some other short segment. In FIG. 5, the frame identifier is the binary code 1100111010, which in decimal is 826. In contrast, in order to depict frame identifiers for 3 hours' worth (10,800 seconds) of frames at 30 fps, there would have to be approximately 324,000 frames. Frame identifiers in such a case would be 19 bits long to accommodate a unique frame identifier for each frame. As shown in FIG. 5, when frame 400 is has been texture-mapped to the spherical mesh 430, the blocks 410*a* to 410*j* having been positioned within the particular regions as described above become invisible to the user.

It will be understood that the entirety of the triangular region above the diagonal (such as region A for subdivision S1) could be used as the block of uniformly-coloured pixels, rather than merely the subset of pixels forming the individual blocks (such as block 410*a*). However, a given digital video with inserted frame identifiers as described herein could be subjected to additional post-processing in order to create copies with reduced resolution for various applications. For example, a given digital video could be processed to provide multiple copies of the digital video, each with a respective lower resolution, so as to support downloading by users having different network capacities and/or playback and buffering capacities and/or to support adaptive bitrate streaming. When processing the digital video to produce such a derivative digital video having a lower resolution, the representation of blocks of pixels corresponding to the entirety of regions A, C, E, G and others have the potential to be replaced as a result of the resolution-reduction operation by blocks of pixels that extend outside of their respective regions. If the replacement blocks of pixels extend outside of their respective regions, they will not be entirely invisible once texture-mapped to the predetermined spherical mesh in such lower-resolution versions. The provision of blocks that use only a smaller, though sufficiently large, subset of the pixels in regions A, C, E, G and others reduces the chance that, during the resolution-reduction operation, the resultant blocks will extend beyond their corresponding regions.

In this embodiment, the geometry of the spherical mesh and its vertices are determined by three parameters:

RG=number of rings
SD=number of many quad subdivisions per ring
R=the radius at which each quad subdivision relative to the view is to be positioned.

Based on the three parameters and the input video frame resolution, the block size and position parameters are determined according to Equations 1 through 6, below:

$$\text{Quad Size Vertical} = \text{VideoHeightResolution}/RG \quad (1)$$

$$\text{Quad Size Horizontal} = \text{VideoWidthResolution}/SD \quad (2)$$

$$\text{BitSpacing} = \text{QuadSizeHorizontal} \quad (3)$$

$$\text{BitHeight} = 0 \text{ to } (\text{QuadSizeVertical} * 0.5) \quad (4)$$

$$\text{BitWidth} = 0 \text{ to } (\text{QuadSizeHorizontal} * 0.5) \quad (5)$$

$$\text{BitPlacementOffset} = 0 \text{ to } (\text{QuadSizeHorizontal} * 0.5 - \text{BitWidth}) \quad (6)$$

In this embodiment, a nonzero BitPlacementOffset is used only if BitWidth has a value that is less than QuadSizeHorizontal*0.5. Otherwise BitPlacementOffset is zero.

FIG. 7 is sample OpenGL code for creating sphere geometry and buffers as well as sample OpenGL code for uploading the geometry.

With the regions having been determined at step 200, the non-image data in the form of frame identifier binary bits is inserted into the determined regions of the frames. In this embodiment, this is done by automatically selecting another digital video—a frame identifier digital video—from a set of frame identifier digital videos. Each frame identifier digital video from which the selection is made is predefined to itself consist of frame identifiers for each frame in the frame identifier digital video, with the remainder of the frame being unpopulated with pixels. The selection of frame identifier digital video is based on the determined resolution such that a frame identifier digital video is selected having frame identifiers sized and positioned appropriate to the resolution. The selected frame identifier digital video is overlaid atop the digital video into which frame identifiers are to be inserted thereby to form a composite digital video containing the frame identifiers. In this embodiment, the frame identifier digital videos are also further subdivided for each given resolution based on number of frames, such that a binary code having a number of bits appropriate to the length of video can be overlaid. In this way, the system can avoid overlaying a binary code that could accommodate a three (3) hour digital video when a binary code that accommodates the target 30-second digital video would suffice and would be faster for a media player to parse under the conditions.

The insertion of frame identifiers into frames is useful for frame-accurate event-triggering. Events are actions to be taken by a media player during playback of the digital video to enrich the playback experience for a user. One example of such an event is a forced perspective. With a forced perspective event, beginning with the frame having the frame identifier associated with a forced perspective event, the view of a user of the digital video is forced to a predetermined visual perspective. That is, the media player enacts a perspective switch to force the user to focus on a particular region of the video that is important for the narrative. This gives creators a vital tool for directing attention in a 360 video or in virtual reality, as examples.

Events can alternatively include one or more projection switches from flat to 360 video and vice-versa, live-rendering and display as well as removal of graphical objects placed over top of the digital video, the display and removal of subtitles, the display and removal of hyperlinked text, the triggering of sound events, the triggering of transmission of a signal for triggering an event on a different device, the triggering of a query to the user, the triggering of billing, the triggering of display of a particular advertisement or of an advertisement of a particular type, and the like. Other events can include programmatic visual effects such as fades and/or the use of faders, overlays rendered independently of the video itself, audio and/or spatial audio events, creation of interactive "regions" within the video that can be used to spawn additional elements or events. For example, after a video cut, a portion of the video such as a character may be made interactive and may be displayed as an overlaid graphic. Such events are planned by the author/editor, for example using the authoring software or using some other means, and are each represented by parameters that are stored in association with respective frame identifiers in a metadata file that is created during authoring/editing. In this way, the events may be triggered in conjunction with the frames in which the frame identifiers associated with the events are inserted. Such frames having corresponding events may be referred to as event-triggering frames.

The metadata file or a derivative of it is meant to accompany the digital video file when downloaded or streamed to a media player for playback, or may be located on the platform hardware hosting the media player. When accompanying the video file it could be included as part of a header of a video file. However, this approach would require re-rendering the video file in order to make modifications to the metadata and, where additional assets were required during event-triggering, such assets would have also to be tightly integrated in some way. Alternatively, when accompanying the video file the metadata file could simply have the same filename and path as the video file, with a different file extension, such that the media player could easily find and handle the two files in cooperation with each other. In this embodiment, the metadata file is in the form of an XML (eXtensible Markup Language) that is downloaded to the media player, parsed and represented in system memory as one or more events associated with a frame identifier that is/are to be triggered upon display of the decoded frame from which the corresponding frame identifier has been parsed. Alternatives in file format are contemplated. Such a frame may be referred to as an event-triggering frame, and there may be many such event-triggering frames corresponding to one or more respective events to be executed by the media player.

In this embodiment, frame 400 having a frame identifier of 826 as described above is an event-triggering frame because there is a corresponding entry in the XML metadata file representing an event to be triggered at frame number 826. In this embodiment, the event is a projection switch from a flat projection to a 360 projection wherein, beginning with the event-triggering frame 400 (frame number 826), the media player is to texture-map frames of the digital video to the predetermined spherical mesh in order to switch from presenting flat video to the user (in which the video has not been texture-mapped to a sphere), to presenting 360 video with a horizontal and vertical rotation of 0, as shown below:

```
<ProjectionSwitch id="1" frame="826"
    type="VIDEO_360" hRot="0" vRot="0"
    fov="65" enabled="true" platform="android"
    forceVRot="TRUE" forceVR="FALSE"/>
```

In this example, "fov" is the field of view of the virtual camera, "enabled" is a switch useful mainly during authoring and editing for indicating whether the Event is to actually occur, and "platform" indicates on which platform the event will be triggered. Where "platform" is concerned, it is the case that multiple platforms may all have the same event but may contain different parameter values based on what is most effective for that platform. For example, it is typically undesirable to at some point move the perspective of a user who is watching content on a virtual-reality display device such as a HMD because doing so can be disorienting, but on the other hand it can be advantageous to move the perspective of a user who is watching the same content on a non-virtual reality display. Other parameters include "forceVRot", a switch to indicate whether the media player should force the vertical orientation when the event occurs, and "forceVR", a switch to indicate whether the media player should force the orientation i.e. force perspective, in general when using a VR platform.

A later frame in the sequence of frames of the digital video may also be an event-triggering frame due to a corresponding entry in the XML metadata file representing an event to be triggered at that later frame. For example, the event may be a projection switch from a 360 projection to a flat projection, wherein, beginning with the later event-triggering frame, the media player is to stop texture-mapping frames of the digital video to the predetermined spherical mesh in order to switch from presenting 360 video to the user to presenting flat video, as shown below:

```
<ProjectionSwitch id="1" frame="1001"
    type="VIDEO_FLAT" hRot="0" vRot="0"
    fov="65" enabled="true" platform="android"
    forceVRot="TRUE" forceVR="FALSE"/>
```

It will be appreciated that the frame identifiers in frames intended for flat video are placed by the decoder in the same position in processor-accessible memory as frame identifiers are placed in the equirectangular frames intended for 360 video. In this way, the media player can, subsequent to decoding, look to the same place in each frame for the frame identifiers. However, since frames intended for flat video will not ultimately be texture-mapped to a spherical mesh, frame identifiers in these frames (if frame identifiers are even inserted) will not, through a mapping operation, become substantially invisible. As such, it is advantageous to modify frames intended for flat video prior to insertion into the frame buffer for display by a display device so that the frame identifiers are not visible. In this embodiment, an additional event is therefore also associated with the later event-triggering frame and stored in the XML metadata file with parameters for a frame modification operation that will cause the inserted data—in this embodiment the frame identifier—to be substantially invisible upon display by the media player. In this embodiment, the frame modification operation includes a frame crop wherein, beginning with the later event-triggering frame, frames of the digital video that are to be flat-projected are cropped thereby to remove the determined regions containing the frame identifiers. As would be understood, cropping of frames to be flat-projected is usually entirely unnoticeable by the user. In an alternative embodiment, an additional event is not required to cause the media player to crop flat frames, as the media player may do this automatically.

An alternative frame modification operation is to colour-modify the blocks of uniformly-coloured pixels representing binary bits of the frame identifier after they have been read by the media player, so that they substantially blend-in with surrounding pixels of the digital video. While this operation can be useful, it has been found that such colour-modifications do not always produce a reliable blending, such that cropping as described above is preferred. Furthermore, such an operation can be expensive from a processing standpoint which can result in slower than desired frame rates.

With the digital video having been locked and having had frame identifiers inserted as described above, the digital video may be encoded using any number of a variety of appropriate codecs which apply compression and formatting suitable for network transmission and formatting for particular target audiences, media players, network capacities and the like.

A device appropriate for playback of a given digital video may take any of a number of forms, including a suitably-provisioned computing system such as computing system 1000 shown in FIG. 2, or some other computing system with a similar or related architecture. For example, the media player computing system may process the digital video for playback using a central processing unit (CPU) or both a CPU and a GPU, if appropriately equipped, or may be a hardware-based decoder. A media player computing system including a GPU would preferably support an abstracted application programming interface such as OpenGL for use by a media player application running on the computing system to instruct the graphics processing unit of the media player computing system to conduct various graphics-intensive or otherwise highly-parallel operations such as texture-mapping a frame to the predetermined spherical mesh. The media player may take the form of a desktop or laptop computer, a smartphone, virtual reality headgear, or some other suitably provisioned and configured computing device.

Various forms of computing system could be employed to play back video content in particular, such as head mounted displays, augmented reality devices, holographic displays, input/display devices that can interpret hand and face gestures using machine vision as well as head movements through various sensors, devices that can react to voice commands and those that provide haptic feedback, surround sound audio and/or are wearables. Such devices may be capable of eye-tracking and of detecting and receiving neural signals that register brain waves, and/or other biometric signals as inputs that can be used to control visual and aural representations of video content.

Figure 6:
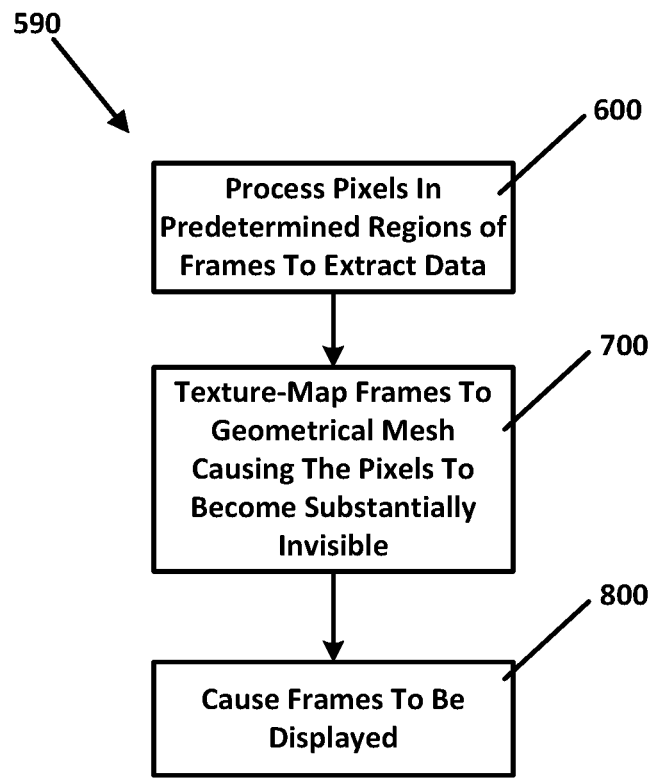
FIG. 6 is a flowchart depicting steps in a method, according to an embodiment.

The XML metadata file containing events to be triggered by the media player and other playback control data is made available for download in association with the encoded digital video file. In order to play back the digital video as well as to trigger the events, the media player processes the digital video file thereby to reconstruct the compressed frames of digital video and store the frames in video memory of the media player for further processing. Further processing conducted by the media player according to a process 590 as shown in FIG. 6 includes processing pixels in the frames to extract data—in this embodiment frame identifiers identifying the sequential position of the frames—from the predetermined regions of the frames in order to uniquely identify each frame (step 600). This is done by a software routine triggered by the media player that references the pixel values at locations in the memory corresponding to the pixels in the middle of the bits of the binary code, such as bit 410*a*. In this embodiment, due to compression the software routine reading the pixel values is required to accommodate for pixel colours that may be slightly off-white, or slightly off-black and so forth in order to be robust enough to accurately detect bit values and ultimately frame identifier values.

In this embodiment, in order to read these coloured blocks the effect of compression on colour is taken into account by assuming that any colour over 50% of 100% intensity is an accurate representation of the intended colour. As such, if a bit is 51% intensity of red, the block of colour is considered to be 1, or 100% intensity. On the other hand, if the colour is 49% intensity, the block is considered to be 0, or 0% intensity. Alternatives are possible, particularly where compression of colour is not very severe or in implementations where no compression is done.

In this embodiment, for processing a frame to extract a frame identifier prior to display by a media player, the i'th bit of the binary code (or whichever code is being employed for the frame identifier), may be determined by reading the values of pixels each positioned at X and Y locations within the frame according to Equations 7 and 8 below:

$$\text{Pixel } i \text{ X Location} = \text{BitPlacementOffset} + (i * \text{QuadSizeHorizontal}) + (\text{BitWidth} * 0.5) \quad (7)$$

where: i>=0

$$\text{Pixel } i \text{ Y Location} = \text{BitHeight}/2 \quad (8)$$

Thereafter, in accordance with an event in the XML metadata file corresponding to the frame identifier of an event-triggering frame, the 360 video frames are texture-mapped by the media player to the predetermined spherical mesh (step 700) and the texture-mapped frame is inserted into the frame buffer RAM as a bitmap for display by the display device of the media player (step 800). During the texture-mapping, the pixels in the predetermined regions, including those blocks of pixels constituting the frame identifiers, become substantially invisible due to having been placed appropriately prior to encoding as described above.

Events associated with an event-triggering frame are triggered by the media player as the event-triggering frame is placed into the frame buffer. Elements such as graphical overlays that are triggered to be rendered by certain events are rendered in real-time and in sync with the digital video frames with which the events are associated.

Although embodiments have been described with reference to the drawings, those of skill in the art will appreciate that variations and modifications may be made without departing from the spirit, scope and purpose of the invention as defined by the appended claims.

For example, while embodiments described above involve inserting a frame identifier into all of the frames of a digital video prior to encoding, alternatives in which frame identifiers are inserted into only a subset of the frames of the digital video are contemplated. In such an alternative embodiment, only event-triggering frames and a threshold number of frames preceding the event-triggering frames in the sequence of frames may be provided with frame identifiers. The metadata file will specify events to be triggered upon display of an event-triggering frame, but the media player will be spared from having to parse each and every frame for a frame identifier. Instead, the media player will estimate the frame using elapsed time in a known manner, but upon approaching the elapsed time approximating the event-triggering frame, the media player can switch to processing frames to extract frame identifier data from the determined regions. In this way, the media player can trigger events with frame-accuracy without having the burden of parsing each and every frame for a frame identifier. After the event has been triggered, the media player can revert to estimating the frame using elapsed time until approaching the time that another event is to be triggered thereby to revert again to parsing frames expected to have a frame identifier.

In an alternative embodiment, whether or not all frames of the digital video have had frame identifiers inserted therein, the media player can operate to parse frame identifiers only from a few frames expected (by estimation using the codec-produced elapsed time timecode) to be preceding the event-triggering frame and the event-triggering frame itself.

In embodiments described above, the data inserted into the determined regions of frames are frame identifiers. In alternative embodiments, such frame identifiers may be represented in ways other than using binary codes. For example, for non-lossy encoding or low-compression encoding, where details of frame identifiers can be better preserved, other symbols such as two-dimensional barcodes may be employed as frame identifiers.

In further alternative embodiments, the data inserted into the determined regions of frames can include other kinds of data either in combination with the frame identifiers or instead of frame identifiers. For example, some of the data may be for error correction, such as parity bits and the like, thereby to enable the parser to verify the frame identifiers. In an embodiment, such alternative data may be digital rights management data, country code data, production source data, or instructions for triggering selection by a media player of a different accompanying XML metadata file depending on some condition pertaining to the media player, such as its physical location for purposes of geoblocking or display of overlays in different languages or the like.

In embodiments described above, a frame identifier digital video is selected based on the determined resolution and length of digital video for forming, along with the digital video into which frame identifiers are to be inserted, a composite video. In alternative embodiments, there may be provided for selection only one frame identifier digital video for each resolution, such that the maximum number of bits ever required are used, even if the digital video with which it forms the composite would only ever make use of the least significant bits due to it being a short digital video.

Furthermore, rather than a frame identifier digital video being selected for forming a composite digital video, a script may be executed to, based on the resolution and the predetermined spherical mesh, dynamically overlay the frame identifiers (and/or other data) by modifying pixels within the determined regions of the digital video. In this way, the inserted data could be dynamically rescaled based on a selected resolution adjustment, rather than requiring the pre-creation of a particular appropriate frame identifier digital video for that resolution. In a similar manner, the number of bits could be adapted based on the length of the digital video.

In embodiments described above, subdivisions S1, S2 etc. at the top of frame 400 correspond to respective positions P1, P2 etc. adjacent to the zenith Z of spherical mesh 430 and therefore include regions A, C etc. that would become invisible upon frame 400 being mapped to spherical mesh 430. It is to be noted that subdivisions at the bottom of frame 400 corresponding to respective positions adjacent to the nadir of spherical mesh 430 (not shown) also similarly include regions that would become invisible upon frame 400 being mapped to spherical mesh 430. As such, in an alternative embodiment, those regions in subdivisions to be mapped adjacent to the nadir of spherical mesh 430 may have data inserted into them in a similar manner as has been described above. An author/editor may choose to use the additional regions to insert a copy of the frame identifier at the top and at the bottom of the frame 400 for redundancy, or to insert other kinds of data.

In embodiments described above, the non-image data inserted into a frame is a frame-accurate timecode that may have a counterpart event stored in a metadata file with parameters for causing the media player to trigger a particular event upon the display of the frame. However, the non-image data inserted into the frame may be of a different nature. For example, the non-image data inserted into the frame may serve as direct instructions to the media player to take some particular action. Such non-image data may, for example, be a block of a particular colour of pixels that serve as direct instructions for the media player to, at the given frame, force a particular predetermined or instructed perspective onto the user thereby to focus on a particular region of the video that is important for a narrative. The media player would not have to consult an event list to be aware that it should execute the given event specified by the particular colour in the block. The colour itself could be used to specify parameters of such a perspective switch, such as location in the frame to which perspective should be changed. In another example, a different event such as a particular projection switch may be triggered using a block of a different particular colour of pixels such that the media player would not have to consult an event list to be aware that it should execute a projection switch from 360 to standard or vice versa at the given frame. Alternatively, such non-image data such as a block of a particular colour of pixels could be used to instruct the media player to take some other action.

Alternatively, where resolution and compression permit, the inserted data may be in the form of a one or two-dimensional barcode that encodes detailed instructions for triggering one or more events. Such a barcode may alternatively or in combination encode digital rights management information, and/or may encode instructions for the media player to trigger billing a user after a free preview period, and/or may encode instructions to display an advertisement, or may encode instructions to prompt the user as a trigger warning, and/or may encode instructions for the media player to take some other action not directly related to the user's direct experience during playback, such as logging the number of views of the digital video. Alternatives are possible.

In embodiments described herein, the frame identifier is inserted as non-image data into all frames. However, alternatives are possible. For example, in an alternative embodiment all frames that are not to be mapped may have non-image data inserted therein that does not represent a frame identifier but instead represents that the frame is not to be mapped, whereas frames that are to be mapped may have non-image data inserted therein that is different from the non-image data inserted into frames that are not to be mapped. Similarly, certain frames may have non-image data inserted therein that could be considered respective frame identifiers, but other frames in the digital video sequence could have no such non-image data inserted therein, or non-image data inserted therein that are not frame identifiers. Various combinations and combinations thereof are possible.

While in embodiment described above, frame-accurate timecodes are employed for triggering events to be executed during display of the digital video, alternatives are possible. One alternative includes the frame-accurate timecodes or other non-image data being employed to control whether or not multiple videos should be displayed at certain times or in addition or in sync with playback of a master video. In such an embodiment, the master video would carry the non-image data which is used either to synchronize independent videos to the master video or to define a range of time where independent videos can be displayed based on user interactivity. For example, a video could be produced that provides the experience of walking through the hall of a virtual shopping mall. As the user approached certain locations within the environment, advertisements could be displayed on the walls of the virtual shopping mall depending on when the user looked at them and depending on aspects of the user's personal profile. The advertisements would be present in videos being selected contextually based on the main video's content from a pool of available advertisement videos. The timecode in this example would not only define when to display an advertisement but also a range of time contextual to the main video environment. In another example, this methodology could be used to create events in a master video that react to users' actions and that are independent of the linear timeline of the video, by live compositing one or multiple pre-prepared video files into the master video. For example, the user might be in a room with a door, but the door opens only when the user looks at it. This may be achieved by compositing together two independent video files: the first being a main 360 frame of the entire room with the door closed and the second being a file containing a smaller independent video tile of the door opening that fits seamlessly into the main 360 frame in a manner that the resulting video appears to the user to be one video without seams. When the user looks at the door the video containing the action of the door opening is triggered independently of the timeline and is live-composited into the separate video of the entire room, thus making it appear that the door opened at the exact the time the user looked at it. Frame accurate timecodes would be essential in synchronizing the live compositing of such independent videos, which may have their own separate timecodes, to create complex sequences of asynchronous action triggered by the user in order to maintain the illusion of totally seamless interactivity for the user.

It has been found by the inventors through trial and error that, due to compression, digital video resolutions lower than 1280×640 are generally unable to support large enough frame identifier bit blocks to both maintain sufficient colour intensity during encoding while also being fully insertable into regions that would become substantially invisible were they to be texture-mapped to the suitable geometrical mesh. As would be understood, particular compression/decompression algorithms may be used that can preserve the frame identifier even at lower resolutions, should they exist and generally be available for use in codecs employed by media players. However, in an embodiment, a media player is provisioned to compensate where it is determined that frame identifier bit blocks cannot reliably be extracted from a particular digital video or stream thereof, or where it is determined that there are no frame identifier bit blocks in a particular segment of the digital video.

For example, in an embodiment, the media player is configured to monitor digital video quality throughout playback and, when the media player detects that frame quality has declined below the a threshold level, the media player switches automatically from extracting frame identifiers from higher-quality frames as described above, to estimating the frame number using another technique. In an embodiment, the media player detects resolution of the last decoded frame. While the resolution detected by the media player remains above a threshold level (such as above 1280 pixels× 640 pixels), the media player continues to extract frame identifiers from frames that incorporate them, as described above. However, should the media player detect that resolution has dropped below the threshold level—as might occur if the digital video is being transmitted using adaptive bitrate streaming in an uncertain network environment—the media player automatically switches over to estimating frame numbers based on elapsed time provided by the codec, and triggering any events associated with such frames based on the estimated frame number. The media player is also configured to continually or periodically monitor resolution and to switch back to extracting frame identifiers as described above, should the media player detect that the resolution of subsequent frames has risen again to or above the threshold level. As would be understood, this would be useful for enabling a media player to adapt in near real-time how it determines the frame number for triggering events, reverting to the most accurate technique whenever possible and as processing power permits. It will be understood that the media player may be configured to switch between extracting and an estimating technique or techniques not only based only on quality of the received digital video, but potentially based on other factors such as monitoring overall performance of a playback device or in response to a user configuring the media player to play back digital video with the minimum of processor involvement.

The technique of the media player monitoring frame quality and adapting how frame number is determined (i.e. either extracted from the frame or estimated using another technique) may also be used as the basis upon which the media player modifies the time at which events should be triggered so that events are not triggered too early or too late with respect to the corresponding event-triggering frame. For example, the media player may be provisioned to automatically determine it should trigger events slightly later than the time the media player has estimated its corresponding event-triggering frame is being displayed, precisely because the time of display of the event-triggering is an estimate. This can be useful for preserving quality of the digital video being displayed. As another example, as described above, when frame number is being estimated using the codec's elapsed time, a projection switch done even a few frames earlier or later than the frame at which the switch should precisely have happened creates a small series of frames mismatched to the projection, which can be jarring enough to disturb the user. As such, in an embodiment, the media player is configured to "freeze" a frame being correctly displayed for a period corresponding to estimated duration of the disparity.

Figure 8:
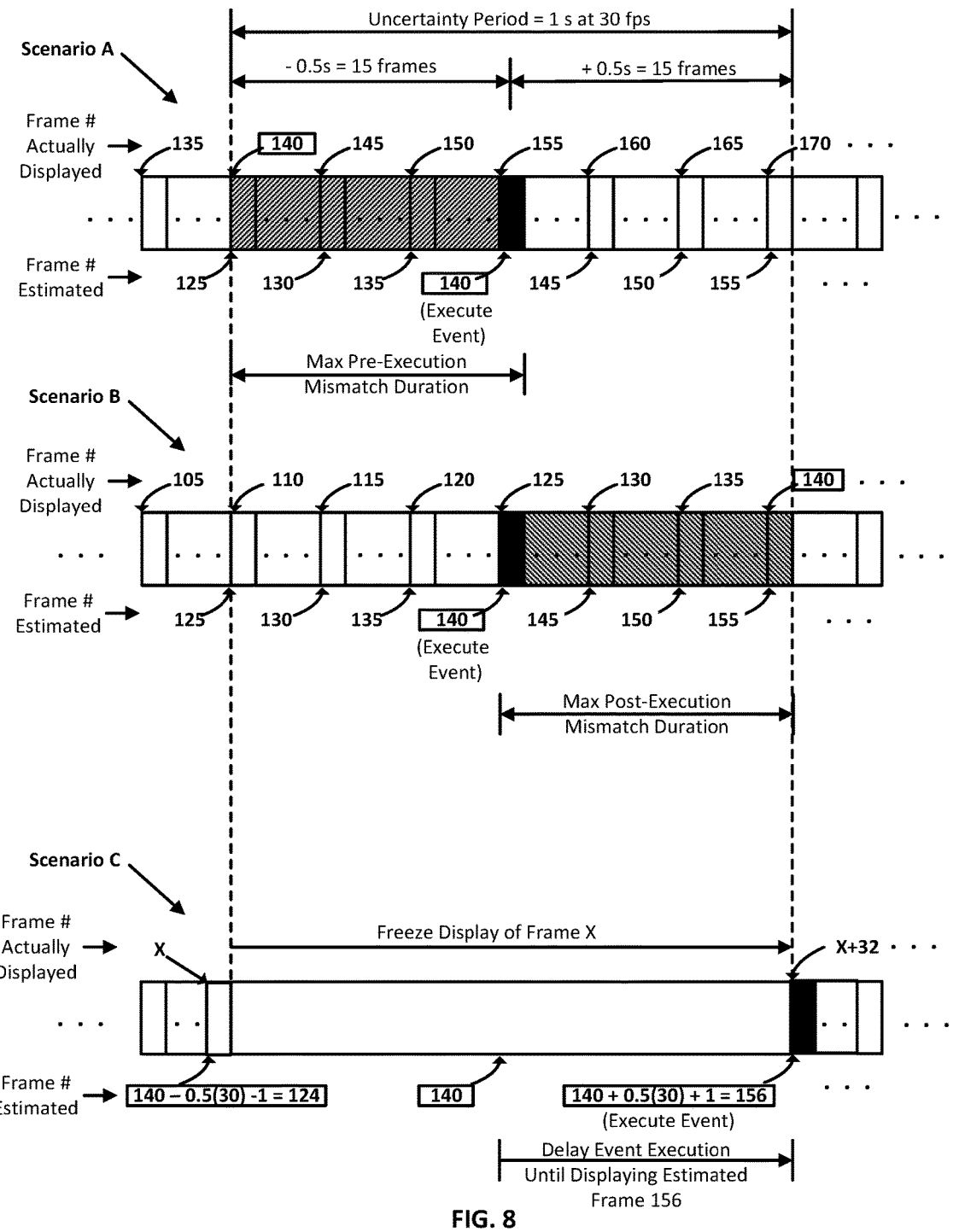
FIG. 8 depicts two scenarios in which frame numbers are estimated by a media player and events are triggered at different times than their respective event-triggering frame is displayed, and a scenario illustrating a solution according to an embodiment.

For example, with reference to FIG. 8, Scenario A shows a series of frames of digital video. Frame number 140 is intended by the content producer to be an event-triggering frame: a frame associated with an event that is to be triggered by the media player when the media player determines that frame number 140 is being displayed. However, the media player is configured to estimate the frame number using playback time for this particular sequence of frames, rather than extracting a frame identifier from the digital video itself. The media player may be configured to always estimate the frame number and to never extract frame identifiers (either for any digital videos or just for the particular digital video containing this frame sequence), or the media player may be configured to estimate the frame number only when it cannot extract frame identifiers because there are none or the quality does not permit, as described above. In either case, because the media player is estimating the frame number for this particular sequence of frames, there is a potential disparity between the frame number actually being displayed and the frame number the media player is estimating is being displayed. As a result, the media player may trigger execution of an event either before or after actual display of the frame with which the event is associated. In Scenario A, frame number 140 is the event-triggering frame. In this embodiment, it is estimated that the maximum time disparity between frame number actually being displayed and a media player's estimate of the frame number is +/−0.5 seconds, which translates to +/−15 frames at a frame rate of 30 frames per second (fps).

As seen in Scenario A, in this digital video sequence frame number 140 is being displayed at the maximum amount of time before the media player estimates it is to be displayed: 15 frames beforehand. As such, the event will be triggered a full 15 frames after the intended event-triggering frame is actually displayed. This will result in a mismatch duration of 15 frames, or 0.5 seconds. As will be understood, should the event be a projection switch, frame numbers 140 to 155 will be displayed with an incorrect projection, resulting in a jarring experience for the user.

Similarly, Scenario B in FIG. 8 depicts a situation in which digital video sequence frame number 140 is being displayed at the maximum amount of time after the media player estimates it is to be displayed: 15 frames afterwards. As such, the event will be triggered a full 15 frames before the intended event-triggering frame is actually displayed. Similar to Scenario A, this results in a mismatch duration of 15 frames, or 0.5 seconds. As will be understood, should the event be a projection switch, frame numbers 125 to 140 will be displayed with an incorrect projection, resulting in a jarring effect for the user.

As can be seen from the extreme cases in Scenarios A and B, therefore, there is an overall Uncertainty Period of 1.0 seconds, consisting of 0.5 seconds before the estimated event-triggering frame number 140, and 0.5 seconds after the estimated event-triggering frame number 140.

Scenario C depicts a solution to the potential for the mismatches, according to an embodiment of the invention. According to Scenario C, the media player is configured to be aware of a maximum disparity of +/−0.5 seconds, and is thus aware of the Uncertainty Period centred on each event-triggering frame. The media player, also being aware of the events to be triggered and the event-triggering frames with which they are associated, tracks the frames it estimates are being displayed during playback. Leading up to an event-triggering frame, the media player will automatically adjust both what is being displayed during the Uncertainty Period, and the time at which the event is triggered. In particular, in Scenario C, the media player freezes the display of a frame X (which it estimates is frame 124) from the time frame X is to be displayed until the end of the Uncertainty Period. This is done by the media player copying that frame into an off-screen buffer and directing use of that frame as the video source for the duration of the Uncertainty Period (i.e., 0.5+0.5 seconds). Also, the media player delays execution of the event(s) associated with event-triggering frame number 140 until the end of the Uncertainty Period. In order to do this, the media player identifies the range of frames in the Uncertainty Period by, for the lower bound, subtracting 0.5-seconds worth of frames at 30 fps from frame number 140 (i.e. frame number 125) and, for the upper bound, adding 0.5-seconds worth of frames at 30 fps to frame number 140 (i.e. frame number 155). The media player prepares therefore to begin freezing the frame just before frame number 125 for the duration of 30 frames. In particular, the media player identifies frame X as the frame just before the lower bound of the Uncertainty Period (i.e. estimated frame number 124 in Scenario C) and freezes that frame from the time it is initially displayed through the Uncertainty Period. After the Uncertainty Period, the media player then displays the next frame (frame number 156) at the same time it executes the event(s) associated with event-triggering frame number 140. The media player then proceeds to display subsequent frames, and will conduct this process again for subsequent events.

As would be understood, the approach illustrated in Scenario C prevents an undesirable mismatch: a frame known (or at least highly-confidently suspected) to be correctly displayed continues to be displayed until it a frame can be displayed that is known (or at least highly-confidently suspected) to be compatible with the conditions caused upon triggering of the event. This is particularly useful for types of events where mismatches can jar the user out of an immersive experience or are otherwise undesirable, such as projection switches and forced perspective events. While this freeze-frame technique can itself be noticeable to a very discerning user, it tends to be less jarring than displaying frames with the wrong projection. In an embodiment, rather than freezing display of only one frame X during the entire Uncertainty Period, the media player may be configured to begin freezing display of frame (X−1) for a period corresponding to several frames following its regular display time and then switch to freezing display of frame X for a period corresponding to the remainder of the Uncertainty Period. This may provide a freeze that is less noticeable to a user. For example, frame (X−1) may be displayed for 0.5 seconds after which frame X is displayed for the remainder of the Uncertainty Period. Alternatives are possible.

It is unlikely that two opposing projection switches (such as a 360→flat and a flat→360) would be required by a content-producer to be conducted within such a very short time of each other so as to both fall within the same Uncertainty Period. As such, it is unlikely that the freeze frame technique described above would itself produce the above-described mismatches as an undesirable byproduct of delaying triggering of the events as described above. However, in an embodiment, the media player is configured to detect that certain opposing events are occurring close in time to each other and to trigger only the second of the events at the end of an Uncertainty Period that spans both of them.

It will be noted that ranges higher or lower than 1 second for the Uncertainty Period may be selected, based for example on the confidence a content producer has in the ability of various media players upon which the content is expected to be played back to closely estimate the frame number that is actually being displayed.

The media player may be configured to, if multiple events are to occur in association with the display of a particular event-triggering frame, delay all of the associated events along with the freeze-frame technique as described above. Alternatively, in an embodiment only certain types of associated events are delayed, such as those events that if executed too early or too late would cause significant disruption in the user experience. Further to this, the above-described freeze-frame technique may be employed by the media player only for certain other types of events that if executed too early or too late would cause significant disruption in the user experience, whereas events that would not cause significant disruption in the user experience are simply executed at the time the media player estimates the event-triggering frame is being displayed (i.e. during the freeze-frame period and not afterwards). Such other kinds of events might include display of independently-rendered overlays for which a slight delay of up to one or two seconds before or after the event-triggering frame might be permissible to the content producer. On the other hand, too-early display of independently-rendered overlays may be inappropriate where the event-triggering frame is one of the first frames to be displayed after a cut. A content-producer would likely prefer not to display such an overlay too early. In an embodiment, the content producer is able to define parameters of an event to specify whether, when frame-identifiers cannot be extracted from the frames as described above and frames must be estimated, it is permissible that particular events be triggered slightly before or slightly after the display of event-triggering frame, or whether it is only permissible that the event be triggered slightly after the event-triggering frame, or whether it is critical that the event be triggered in conjunction with a freeze-frame operation as described above.

What is claimed is:

1. A computer-implemented method of processing digital video, the method comprising:
    determining at least one two-dimensional frame region of frames of the digital video, wherein each of the at least one two-dimensional frame region is defined by a respective vertex trio, that would be at least substantially mapped out of the frames upon executing a predetermined texture-mapping of the frames onto a predetermined three-dimensional geometry:
    inserting non-image data into at least one selected frame of the digital video, the inserting comprising: modifying contents only within one or more of the determined two-dimensional regions, wherein modifying contents only within one or more of the determined two-dimensional regions enables the inserted none image data to be at least substantially mapped out of each selected frame upon execution of the predetermined texture-mapping of each selected frame thereby to enable displaying each selected frame subsequent to the texture-mapping at least substantially without displaying the non-image data.

2. The computer-implemented method of claim 1, wherein the non-image data comprises:
    a frame identifier uniquely identifying each of the at least one selected frame.

3. The computer-implemented method of claim 2, further comprising:
    creating at least one association between a frame identifier and one or more events to be executed by a media player;
    storing the at least one association with event parameters in a metadata file; and
    associating the metadata file with the digital video.

4. The computer-implemented method of claim 3, wherein the one or more events comprise:
    a forced perspective wherein, beginning with the selected frame, the view is forced to a predetermined visual perspective.

5. The computer-implemented method of claim 3, wherein the one or more events comprise:
a projection switch from a geometrical projection to a flat projection wherein, beginning with the selected frame, frames of the digital video are to be flat-projected by the media player prior to display.

6. The computer-implemented method of claim 3, wherein the one or more events comprise:
a projection switch from a flat projection to a geometrical projection wherein, beginning with the selected frame, frames of the digital video are to be texture-mapped by the media player to the predetermined geometry prior to display.

7. The computer-implemented method of claim 2, wherein each frame identifier comprises:
blocks of uniformly-coloured pixels inserted into respective ones of a plurality of the determined regions, each block of uniformly-coloured pixels being coloured according to a value.

8. The computer-implemented method of claim 7, wherein each of the uniformly-coloured pixels has a maximum intensity.

9. The computer-implemented method of claim 7, wherein the number of blocks is correlated with a total number of frames in the digital video.

10. The computer-implemented method of claim 9, wherein the value of each block is either 0 or 1.

11. The computer-implemented method of claim 2, wherein inserting the non-image data comprises:
based at least on the resolution of the digital video, selecting a frame identifier digital video from a set of frame identifier digital videos, the selected frame identifier digital video comprising frames having respective frame identifiers positioned and dimensioned to correspond to the at least one determined region; and
forming a composite video using the frame identifier digital video and the digital video.

12. The computer-implemented method of claim 11, wherein selecting the frame identifier digital video from a set of frame identifier digital videos is also based on the total number of frames of the digital video.

13. The computer-implemented method of claim 2, wherein inserting a respective frame identifier comprises:
based at least on the resolution of the digital video, executing a script to overlay respective frame identifiers onto the digital video in the determined at least one region.

14. The computer-implemented method of claim 13, wherein the script overlays frame identifiers onto respective frames based on the total number of frames in the digital video.

15. The computer-implemented method of claim 1, wherein the non-image data comprises:
at least one instruction for a media player.

16. The computer-implemented method of claim 15, wherein the at least one instruction comprises:
an instruction for the media player to execute an event when the media player is displaying the selected frame.

17. The computer-implemented method of claim 16, wherein the event comprises:
a forced perspective wherein, beginning with the selected frame, the view is forced to a predetermined visual perspective.

18. The computer-implemented method of claim 16, wherein the instruction comprises event parameters.

19. The computer-implemented method of claim 1, wherein the non-image data comprises:
digital rights management data.

20. The computer-implemented method of claim 1, wherein the predetermined geometry is a spherical mesh.

21. The method of claim 20, wherein the vertices within frames are determined by subdividing frame area into equal rectangular portions based on a number of latitudinal subdivisions, a number of longitudinal subdivisions and a radius of the spherical mesh, the vertices of the spherical mesh being based on the intersections of the latitudinal and longitudinal subdivisions according to the radius.

22. The method of claim 21, wherein determining at least one two-dimensional frame region comprises:
selecting equal rectangular portions that correspond to a mapped position adjacent to a zenith of the spherical mesh and/or the equal rectangular portions that correspond to a mapped position adjacent to a nadir of the spherical mesh;
wherein the determined regions are regions encompassed by respective triangles above each diagonal in respective ones of the selected equal rectangular portions.

23. The computer-implemented method of claim 1, further comprising:
determining resolution of the digital video,
wherein the step of determining at least one two-dimensional frame region comprises:
based on the resolution, determining dimension and position of the determined at least one region.

24. A computer-implemented method of processing digital video, the method comprising:
for each of a plurality of frames of the digital video:
processing contents in one or more predetermined two-dimensional regions of the frame to extract non-image data therefrom, the one or more predetermined regions defined by respective vertex trios;
executing a predetermined texture-mapping of the frame onto a three-dimensional geometry, wherein the predetermined two-dimensional regions are at least substantially mapped out of the frame by the executing of the predetermined texture-mapping thereby to at least substantially map the non-image data in the one or more predetermined regions out of the frame; and
subsequent to the at least substantially mapping the non-image data out of the frame, causing the texture-mapped frame to be displayed.

25. The computer-implemented method of claim 24, further comprising:
determining location and dimension of the predetermined regions based on resolution of the digital video.

26. The computer-implemented method of claim 24, wherein the predetermined geometry is a spherical mesh.

27. The computer-implemented method of claim 24, wherein the non-image data comprises at least one frame identifier each uniquely identifying a respective frame.

28. The computer-implemented method of claim 27, further comprising:
determining a metadata file associated with the digital video;
identifying any events associated in the metadata file with the at least one frame identifier; and
for each of the plurality of frames of the digital video, while causing the frame to be displayed:
executing, in accordance with event parameters stored in the metadata file, each of any events that is/are associated in the metadata file with the frame identifier for the frame.

29. The computer-implemented method of claim 28, wherein the events comprise:
a projection switch from a geometrical projection to a flat projection wherein, beginning with the frame to be displayed, frames of the digital video are to be flat-projected by the media player prior to display.

30. The computer-implemented method of claim 28, wherein the events comprise:
a projection switch from a flat projection to a geometrical projection wherein, beginning with the frame to be displayed, frames of the digital video are to be subjected to the predetermined texture-mapping onto the predetermined geometry.

31. The computer-implemented method of claim 28, wherein the at least one instruction comprises:
an instruction to execute an event upon displaying the selected frame.

32. The computer-implemented method of claim 31, wherein the instruction comprises event parameters.

33. The computer-implemented method of claim 24, wherein the non-image data comprises:
at least one instruction for a media player.

34. The computer-implemented method of claim 24, wherein the non-image data comprises:
digital rights management data.

35. A computer-implemented method of processing digital video, the method comprising:
causing frames of the digital video to be displayed;
for a period beginning prior to an estimated time of display of an event-triggering frame and ending after the estimated time, causing a frame that is to be displayed prior to the beginning of the period to remain displayed; and
after the period, executing at least one event associated with the event-triggering frame and resuming display of subsequent frames of the digital video.

36. A computer-implemented method of processing digital video, the method comprising:
for each of a plurality of frames of the digital video:
extracting a frame identifier uniquely identifying a respective frame by processing contents in one or more predetermined regions of the frame; and
for each of a different plurality of frames of the digital video:
estimating the frame identifier based on playback time of the digital video.

37. The computer-implemented method of claim 36, comprising:
conducting the extracting only in the event that a quality of the frames to be processed is at or above a threshold level; and otherwise:
conducting the estimating.

38. The computer-implemented method of claim 37, further comprising:
causing the digital video to be displayed;
while conducting the estimating:
for a period beginning prior to an estimated time of display of an event-triggering frame and ending after the estimated time, causing a frame that is to be displayed prior to the beginning of the period to remain displayed; and
after the period, executing at least one event associated with the event-triggering frame and resuming display of subsequent frames of the digital video.

39. The computer-implemented method of claim 38, further comprising:
while conducting the extracting, executing at least one event associated with an event-triggering frame at the time of display of the event-triggering frame.

40. A non-transitory processor readable medium embodying a computer program for processing digital video, the computer program comprising:
program code for determining at least one two-dimensional frame region of frames of the digital video, wherein each of the at least one two-dimensional frame region is defined by a respective vertex trio, that would be at least substantially mapped out of the frames upon executing a predetermined texture-mapping of the frames onto a predetermined three-dimensional geometry;
program code for inserting non-image data into at least one selected frame of the digital video, the inserting comprising:
modifying contents only within one or more of the determined two-dimensional regions,
wherein modifying contents only within one or more of the determined two-dimensional regions enables the inserted non-image data to be at least substantially mapped out of each selected frame upon execution of the predetermined texture-mapping of each selected frame thereby to enable displaying each selected frame subsequent to the texture-mapping at least substantially without displaying the non-image data.

41. A non-transitory processor readable medium embodying a computer program for processing digital video, the computer program comprising:
program code that, for each of a plurality of frames of the digital video:
processes contents in one or more predetermined two-dimensional regions of the frame to extract non-image data therefrom, the one or more predetermined regions defined by respective vertex trios;
executes a predetermined texture-mapping of the frame onto a three-dimensional geometry, wherein the predetermined two-dimensional regions are at least substantially mapped out of the frame by the executing of the predetermined texture-mapping thereby to at least substantially map the non-image data in the one or more predetermined regions out of the frame; and
subsequent to the at least substantially mapping the non-image data out of the frame, causes the texture-mapped frame to be displayed.

42. A system for processing digital video comprising:
processing structure determining at least one two-dimensional frame region of frames of the digital video, wherein each of the at least one two-dimensional frame region is defined by a respective vertex trio, that would be at least substantially mapped out of the frames upon executing a predetermined texture-mapping of the frames onto a predetermined three-dimensional geometry, the processing structure inserting non-image data into at least one selected frame of the digital video by modifying contents only within one or more of the determined two-dimensional regions.

43. A system for processing digital video comprising:
processing structure that, for each of a plurality of frames of the digital video:
processes contents in one or more predetermined two-dimensional regions of the frame to extract non-image data therefrom, the one or more predetermined regions defined by respective vertex trios;
executes a predetermined texture-mapping of the frame onto a three-dimensional geometry, wherein the predetermined two-dimensional regions are at least substantially mapped out of the frame by the executing of the predetermined texture-mapping thereby to at least substantially map the non-image data in the one or more predetermined regions out of the frame; and
subsequent to the at least substantially mapping the non-image data out of the frame, causes the texture-mapped frame to be displayed.

\* \* \* \* \*